July 21, 1953
H. A. SWALLOW
2,645,813
PROCESS AND APPARATUS FOR CONTINUOUS
MILLING OF PLASTIC MATERIAL
Filed June 29, 1950
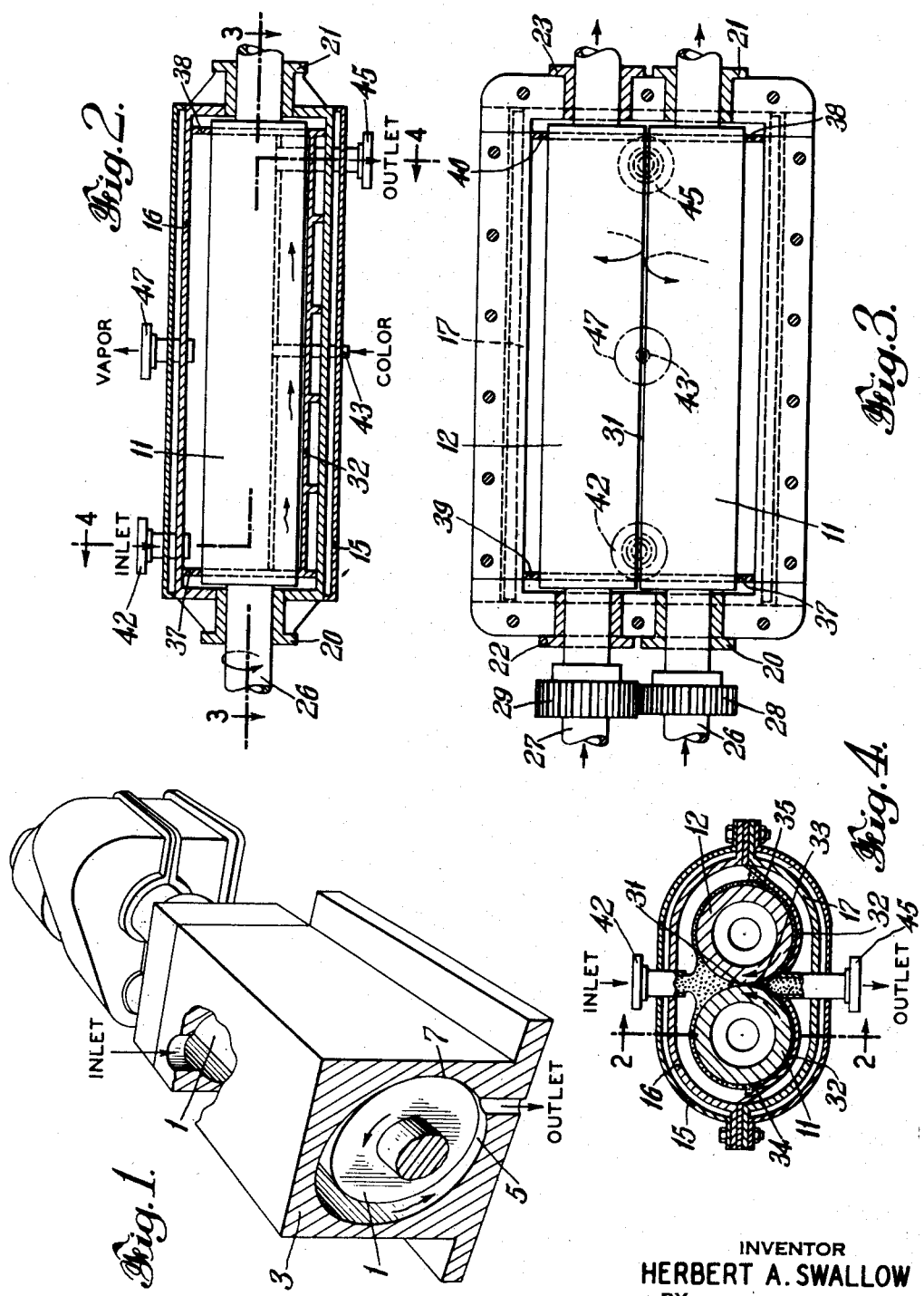
INVENTOR
HERBERT A. SWALLOW
BY
ATTORNEY Patented July 21, 1953

2,645,813

UNITED STATES PATENT OFFICE 2,645,813

PROCESS AND APPARATUS FOR CONTINUOUS MILLING OF PLASTIC MATERIAL

Herbert A. Swallow, Plainfield, N. J., assignor to Union Carbide and Carbon Corporation, a corporation of New York Application June 29, 1950, Serial No. 171,129

13 Claims. (Cl. 18—2)

This invention relates to an improved continuous method and apparatus for milling and conveying normally solid plastic materials, such as vinyl polymers, synthetic and natural rubbers, phenol-aldehyde resins, cellulose plastics, and alkyd and polyester resins. The term "milling" as herein used is generically descriptive of the mixing operations on plastics, known as compounding, mechanically working, masticating and the like, and further includes fluxing or melting of solid plastics to a viscous condition.

The conventional smooth-surfaced, parallel mixing rolls have long been used for batch-wise milling of plastic material. Attempts have been made to modify such rolls for continuous milling of plastic material and continuous discharge of the milled material by the addition of plows, scrapers and the like to the rolls. Such modifications have not been completely satisfactory.

Intermeshing threaded rolls have also been proposed as a means for continuously milling plastic material, as well as continuously discharging or extruding the milled plastic. These devices are expensive to construct and maintain, in comparison to the conventional plain mixing rolls, and the comminuting action of threaded rolls is highly detrimental to fibrous fillers when present in the plastic undergoing milling.

According to the present invention, milling of a normally solid plastic material and continuous discharge of the milled plastic is accomplished by initially converting the solid plastic to a viscous, adhesive condition, as by heating, mechanically working, dissolving in a solvent, or dispersing as finely divided particles in a partial-solvent or non-solvent to form a plastisol or organosol. The viscous plastic is then brought into adhesive contact with the peripheral area of a smooth-surfaced roll, rotor, or similar surface of revolution, rotating on a normally fixed longitudinal axis. The plastic in adhesive contact with the roll is repeatedly circumferentially carried around to a longitudinal milling bite formed between the roll and a stationary surface having a flat, convex or concave shape adjacent to the roll surface.

Preferably the stationary surface is in the shape of a stator or housing partially or completely encircling the roll, and eccentrically positioned with respect to the roll to provide therebetween a convergent zone of decreasing clearance terminating in a final clearance of at least mechanical clearance to form the said milling bite. By feeding more viscous plastic to the roll surface than can be adhesively dragged or carried by the roll through the final clearance or milling bite, the excess accumulates in the convergent zone. A hydrodynamic pressure is generated on the plastic in the convergent zone by the action of the roll adhesively carrying still more plastic to the convergent zone and wedging the plastic therein. The plastic in the convergent zone while under said pressure is subjected to high rates of shear, the magnitude being dependent upon the peripheral speed of the roll. This shearing action effectively mills and uniformly disperses the ingredients normally present in plastic compositions.

The generated pressure can be employed to longitudinally convey the plastic material in the convergent zone, simultaneously while it is being milled, to each end of the roll for discharge. Thus by constantly feeding plastic material to the center section of the roll, a substantially equal portion of milled plastic material is conveyed in opposite direction for discharge at both ends of the roll.

By providing a seal between the roll and one end of the convergent zone and its milling clearance terminus, and means for feeding plastic material to the roll surface near such sealed end, the plastic material while being milled is conveyed longitudinally through the convergent zone to the unsealed end for discharge.

When seals are provided for both ends of the convergent zone and its milling clearance terminus, the generated pressure can be employed for conveying plastic material along the convergent zone towards an opening in the stator, said opening leading directly into the converging zone. The opening can be in the form of an extrusion die to impart a specific shape to the plastic as it is being discharged. The pressure exerted on the plastic at the extrusion opening is conjointly dependent on several factors, including the viscosity and adhesiveness of the particular plastic, the peripheral speed of the roller, the dimensions of the converging zone and its milling clearance, and the dimensions of the extrusion die orifice. As these dimensions are enlarged for a constant peripheral speed, a lower pressure is generated, and conversely higher pressure is generated when these dimensions are reduced.

Although feeding of the plastic to the apparatus in a viscous condition is preferred for reasons of uniformity and ease of introduction, the plastic may also be fed to the apparatus in comminuted or powdered form, and then brought into viscous condition by the frictional heat developed in being wedged and mashed into the convergent zone.

The enclosure of the rotor and stator in a housing having a chamber open to the rotor surface permits release of undesirable volatile matter from the plastic material adhering to the rotor surface during the milling operation. The volatile matter released into the chamber can be exhausted therefrom by vacuum pumps, or purged by introducing in the chamber a gas which is non-condensable at the operating temperature of the apparatus and inert to the plastic, for example, argon, helium, nitrogen, and in some instances carbon dioxide or air.

Coloring matter such as pigments or dyes can either be initially mixed with the plastic material prior to its being fed to the apparatus, or independently introduced into the milling apparatus by a separate feeding means discharging either in the convergent zone or at any other convenient location to the rotor surface.

The smooth surfaces of the rotor and stator in the present apparatus enable uniform mixing of fibrous fillers, such as wood flour, textile fibers, thread, chopped fabric or cloth without undue comminution or deterioration of such fillers. Moreover, the smooth surfaces of the rotor and stator in the present apparatus prevent clogging or pocketing of plastic material. This is of particular importance in the milling of plastics which are heat-sensitive, such as thermosetting phenolic or urea resins, or thermoplastics such as polyvinyl chloride or vinylidene chloride, since if a portion of such plastic were to be retained in pockets, cavities or in thread roots, as with threaded rolls, the retained material hardens, decomposes, chars or is otherwise undesirably changed to its detriment, as well as contaminating the remainder of the plastic in its neighborhood.

While smooth surfaces are a desideratum on the rotor and stator, there is no restriction however of the shape or configuration of either the rotor or stator to cylindrical forms, since the same functions of continuous milling and conveying can be obtained by using as the rotor or surface of revolution such geometrical shapes as tapered or conical rolls, spheres, and combinations of such shapes, and as a stator therefore, a similarly shaped stationary member eccentrically or tangentially positioned with respect to the particular rotor to form therewith a convergent area longitudinally along the rotor.

While a milling apparatus of a single rotor and complementary stator produces an effective continuous milling action, a preferred embodiment of the invention comprises a pair of parallel, smooth surfaced, cylindrical, mixing rolls, suitably mounted in a housing to provide a milling or bite clearance longitudinally therebetween, such as is normally provided in conventional plastic mixing rolls, e. g., from a minimum of about 0.001 inch to about 0.060 inch and even more. Attached to, or as an integral part of the housing supporting the pair of rolls, there is provided a stator in the form of a saddle-shaped member partially encircling each roll and including the pressure bite area of said rolls. Each end of the saddle opens tangentially away from the roll immediately contiguous thereto to form a converging zone or tapering clearance space between it and such roll. The rolls are rotated in counterdirections to each other and to move progressively through the convergent space and then to the bite area between the rolls. Preferably the rolls are rotated at differential speeds to enhance the overall shearing action on the plastic.

The single roll embodiment and the dual or paired roll embodiment are illustrated in the accompanying drawing in which:

Fig. 1 is an isometric view, partly in broken section and showing a single roll eccentrically positioned in a stator completely encircling the single roll;

Fig. 2 is a vertical longitudinal section of a continuous two-roll milling apparatus along the line 2—2 of Fig. 4;

Fig. 3 is a horizontal longitudinal section on the line 3—3 of Fig. 2; and

Fig. 4 is a cross-section on the line 4—4 of Fig. 2.

The milling apparatus depicted in Fig. 1 comprises essentially a smooth surfaced roll 1 rotated in a counterclockwise direction by means of a motor connected to the roll 1 through a speed reducer. The roll 1 is eccentrically positioned for rotation within a stator in the form of a housing 3 having a smooth surfaced circular bore of larger diameter than the roll 1. The shaft ends of the roll rotate in bearings (not shown) at each end of the housing. The eccentric mounting of the roll 1 within the housing bore provides a curved, wedge-shaped converging space 5 longitudinally along the length of the roll and in the direction of rotation, which space 5 terminates in a milling clearance space 7.

An inlet opening for introducing plastic material to the roll surface is positioned at one end of the housing 3, and preferably such inlet, as is shown in Fig. 1, is at some distance away from the convergent zone 5 whereby the plastic material may be fed to the interior of the apparatus by gravity alone, if sufficiently fluid, in contrast to feeding at the convergent zone where the plastic must be fed to the apparatus under pressure sufficient to overcome the pressure generated in the convergent zone. The outlet for discharging milled plastic material from the apparatus is located at the other end of the housing 3 and opens into the convergent zone 5.

The apparatus shown in the Figs. 2, 3, and 4 comprises two smooth-surfaced cylindrical rolls 11, 12 mounted in parallel relationship to each other in a jacketed housing 15 consisting of an upper casing 16 and a lower casing 17, which together completely confine the rolls 11, 12. Each end of the rolls is supported by bearings 20, 21, 22, 23 in the jacketed housing 15. Shafts 26, 27 extend from the rolls and have attached thereto intermeshing differential ratio gears 28, 29 to rotate the rolls in a counterdirection and at a differential speed to each other, by means of a motor or other prime mover connected thereto (not shown). The shafts 26, 27, as well as the rolls 11, 12, are cored for supplying hot or cold fluids to the interior of the rolls for maintaining such temperatures on the roll surface as may be required for the milling of any particular plastic material. Likewise the housing 15 is provided with jackets for cooling or heating the plastic material in the apparatus.

Mounted within the housing 15 is a saddle-shaped member 32 positioned around the lower half of each roll and having a center-section projecting inwardly towards the bite area 31 of the rolls but leaving therebetween a substantially triangular shaped passageway 33. The outer ends of the saddle 32 project tangentially away from the rolls and terminate at the junction of the upper and lower casings 16, 17, thereby forming converging clearance spaces 34, 35 between it and the rolls. The converging spaces 34, 35 terminate in a milling clearance, which clearance extends circumferentially around a portion of the adjacent roll and finally terminates at the projecting central tip of the saddle 32. By so extending the milling clearance around each roll, a much greater area is provided wherein the plastic can be intensively milled and sheared, in comparison to the narrow edge-like milling area of the conventional nip or bite area 31 between parallel rolls.

Preferably the nip or roll bite area 31 is of narrower width than the total width of both the extended milling clearances, whereby plastic material can be discharged from both extended milling clearances into the triangular shaped passageway 33 in greater volume than can pass through the nip bite area 31 between the rolls, and thus maintain the plastic in the passageway 33 under positive pressure for conveying movement.

Seals 37, 38, 39, 40 are positioned at the ends of each roll 11, 12 and the saddle plate 32 to effectively seal off each end section of the converging spaces 34, 35, their extended milling clearances, the triangular passageway 33 and the nip area 31 of the rolls, and thereby substantially retain the plastic material under pressure in the overall space between the rolls and the saddle plate. Without such seals 37, 38, 39, 40, or equivalent thereof, the plastic material would dissipate the pressure being generated thereon by displacement of plastic material at either end of the converging zones and not through the desired discharge orifice.

An inlet passageway 42 opening into the interior of the housing 15 is provided for feeding plastic material to the rolls. Another inlet passageway 43 is provided in the housing 15 and opens directly into the milling bite area 31 of the rolls for feeding fillers, plasticizers, coloring matter such as pigment or dyes, or any other modifying agent into the plastic as it is being milled. Such modifying agents are forced through the passageway 43 by means of an external pumping device not shown. At the other end of the rolls and furthest remote from the inlet 42 for plastic material, there extends into the triangular shaped passageway 33, an outlet passageway 45 for discharging the milled plastic from the apparatus. This outlet 45 can be in the form of an extrusion die for imparting a desired shape continuously to the plastic as it is being discharged.

An outlet 47 for removing volatiles released from the plastic as it is being milled is located in the upper casing 16.

A typical operation of the apparatus is conveniently illustrated by the milling treatment of a polystyrene suitable for injection molding. The apparatus employed was essentially that depicted in the drawing and comprised two parallel rolls having a 12½ inch diameter and a length of 60 inches. With the differential gearing provided on the shaft ends of the rolls, one roll 11 operated at a speed of 50 R. P. M. and the other roll 12 at a speed of 47 R. P. M. The bite clearance 31 between the rolls was 0.060 inch, and the minimum average width of each extended milling clearance from the terminus of the converging zones 34, 35 was about 0.375 inch. The projecting tip of the saddle between the rolls was about 1.0 inch away from the bite 31 of the rolls, and therefore left a small triangular shaped channel 33 along the length of the rolls to serve as the main passageway for longitudinal movement of the plastic. Oil as a temperature controlling media was circulated in the jackets of the casing and cores of the rolls to maintain a surface temperature of about 200° C.

The feed to the rolls through the inlet 42, comprised a partially polymerized styrene mixture of about 75 percent polymer and 25 percent styrene monomer. This mixture was heated to 140° C. prior to its being fed into the apparatus, and accordingly was in a highly viscous state. The mixture was flowed onto the top surface of both rolls, forming there a triangular shaped pool, with the apex extending about half the length of the rolls towards the discharge end. The mixture was repeatedly milled by being adhesively carried by the rolls away from the pool and downwardly around to the converging zones, through the extended milling area and then through the milling bite 31 between the rolls. Volatile matter released from the plastic as it was being milled was continuously removed from the interior of the casing at atmospheric pressure through the volatile outlet.

Upon attaining operating equilibrium, the milled plastic was continuously discharged at a rate of 300 to 325 pounds per hour, the product as discharged was a commercially satisfactory molding material having an average molecular weight of about 60,000 and a solids content averaging 96–97 percent, the balance being methanol-soluble matter. The temperature of the plastic at discharge averaged about 300° C. This increase in the plastic's temperature is indicative of the highly efficient milling action of the rolls. With this plastic being extruded in ribbon form through an extrusion die positioned at the outlet 45 and having an opening in the form of a slot 2 inches long and $\frac{1}{16}$ inch in width, an extrusion pressure averaging 100 pounds per square inch was noted.

That all of the plastic material was uniformly and continuously conveyed, while being milled, was demonstrated by the rapidity with which it was possible to change from one color plastic to another, without the necessity of dismantling and manually cleaning the equipment. Upon changing the color material being introduced, through the color inlet 43, and continuing to feed viscous plastic material through its regular inlet 42, the apparatus self-purged itself of the remnants of the previous color plastic within 5 to 15 minutes of continued operation.

In the appended claims, the term "smooth-surfaced" is intended to describe operating surfaces of substantial smoothness on the rotor and stator as are normally attained in the finishing of metal surfaces by machining, grinding or the like, and to include etched or matte surfaces, but to be distinct from and exclusive of threaded, perforated, rifled or grooved surfaces typical of screw or threaded roll mills or similarly interior surfaced housings or bores for rolls.

The apparatus may be constructed of any material of construction having adequate strength, rigidity and freedom from deleterious effects on the particular plastic. For example iron surfaces on the rotor and stator are satisfactory for some rubber and thermosetting plastics, whereas stainless steel or chromium plated steel are preferred for vinyl polymers, particularly vinylchloride polymers and copolymers.

The apparatus may also be used for the milling and continuous conveying of paint pigments in the preparation of coating vehicle. In such instance, the pigment, preferably in paste form as by pre-mixing of the dry pigment with a coating vehicle such as oil or varnish, is fed to the apparatus in the same manner as that hitherto described for the plastic materials, but more restricted milling clearances at the terminus of the converging areas, for instance .001 to .005 inch, are required to obtain the type of pigment dispersions adequate for coating purposes.

What is claimed is:

1. In a process for milling normally solid plastic material by a rotating smooth surface of revolution and a stationary smooth surface positioned with respect to said rotating surface to provide between the respective surfaces a convergent zone in the direction of rotation and terminating in a milling clearance longitudinally along the rotating surface, said zone having an orifice for discharging milled plastic material, which comprises compounding the plastic by introducing it as a viscous adhesive mass into the convergent zone, milling the plastic by rotating the surface of revolution to adhesively drag the viscous plastic mass into said zone in an amount larger than that which can completely pass through said milling clearance to thereby subject the viscous mass in said zone to shear and pressure and discharging the milled plastic by longitudinally moving the plastic along the convergent zone to the discharge orifice by means of said pressure.

2. In a continuous process for milling plastic material and extruding the milled plastic by a smooth-surfaced rotor, a similarly surfaced stator eccentrically positioned with respect to the rotor to form therewith a zone converging to a milling clearance longitudinally along a portion of the rotor's peripheral surface, and an extrusion die in communication with said zone, which comprises applying the plastic in a viscous, adhesive condition to the peripheral surface of the rotor at a point remote from the extrusion die, milling the plastic by rotating the rotor to continuously drag the viscous plastic adhering to its surface into the convergent zone to fill the zone with plastic at a rate maintaining the plastic therein under pressure, moving the plastic in said zone longitudinally along the rotor surface to the extrusion die by means of said pressure, and extruding the plastic through the die.

3. In a process for progressively milling plastic material and extruding the milled plastic by a smooth surfaced roll rotating within a smooth-walled casing and forming therewith longitudinally along a portion of the rotor's periphery a converging zone terminating in a milling clearance in the direction of rotation and an extrusion die in communication with said zone, which comprises reducing the plastic to a viscous, adhesive mass, adhesively applying the plastic to the roll surface, milling the plastic by rotating the roll at a speed to carry the plastic adhering thereto into the converging zone in an amount filling the zone with plastic under pressure, and extruding the plastic as it is being milled by means of said pressure.

4. In a continuous process for milling a normally solid plastic material and extruding the milled material by a pair of smooth surfaced mixing rolls rotating in opposite directions and having their bite area partially enclosed by a smooth-surfaced saddle, the extremities of said saddle diverging away from the rolls to form longitudinally along the rolls a converging entrance between the rolls and the saddle leading to the bite area, and an extrusion die in communication with said bite area, which comprises reducing the plastic to a viscous, adhesive state, adhesively applying the viscous plastic to the roll surfaces, milling the plastic by rotating the rolls to drag the adherent plastic into the converging entrances in an amount completely filling the convergent entrances up to the bite area and generating pressure on the plastic confined therein, continuously moving the plastic as it is being milled longitudinally along the roll towards the extrusion die by the pressure generated in the convergent entrances, and discharging the plastic through the die by means of said pressure.

5. Apparatus for milling and conveying plastic material comprising in combination, a rotor having a smooth surface of revolution, a stationary surface at least partially encircling the rotor and eccentrically positioned with respect to the rotor to form therebetween a converging space decreasing to a plastic milling clearance longitudinally along a portion of the rotor's periphery.

6. Apparatus for milling and conveying plastic material comprising in combination, a rotor having a smooth surface of revolution, a stationary surface at least partially encircling the rotor and eccentrically positioned with respect to the rotor to form therebetween a converging space decreasing to a plastic milling clearance longitudinally along a portion of the rotor's periphery, a seal on one longitudinal end of said converging space, and means for feeding plastic to the rotor at a point adjacent to said seal.

7. Apparatus for milling and extruding plastic material comprising in combination, a smooth surfaced roll, means for rotating the roll, a casing having smooth interior walls and at least partially enclosing said roll, a longitudinal portion of said walls projecting towards the roll and terminating at a plastic milling clearance distance from the roll surface to form a convergent space between the roll and interior wall of the casing, a seal at each longitudinal end of said space between the roll and the casing, a passageway through the casing communicating with the convergent space for discharging plastic material.

8. Apparatus for milling and conveying plastic material comprising in combination a journaled base, a pair of smooth surfaced rolls mounted on said journaled base in parallel relationship to each other and with a plastic milling clearance therebetween, means for rotating the rolls in opposite directions to each other, a casing having smooth interior walls at least partially encircling each of said rolls and including the bite area between said rolls, said walls being separated from the rolls by a converging milling clearance in the direction of rotation.

9. Apparatus for milling and conveying plastic material comprising in combination a journaled base, a pair of smooth surfaced rolls mounted on said journaled base in parallel relationship to each other and with a plastic milling clearance therebetween, means for rotating the rolls in opposite directions to each other, a casing having smooth interior walls at least partially encircling each of said rolls and including the bite area between said rolls, said walls being separated from the rolls by a converging milling clearance in the direction of rotation, a seal at one end of said casing to confine plastic material in the milling clearance between the rolls and casing walls, and means for feeding plastic material to the rolls adjacent to the sealed end thereof.

10. Apparatus for continuous milling and extrusion of plastic material comprising in combination, a pair of parallel smooth surfaced mixing rolls, a housing inclosing and supporting the rolls, said housing having a chamber open to the rolls and a saddle plate partially encircling with a milling clearance therebetween each of said rolls including the bite area thereof, said saddle plate extending outwardly away from the rolls to form entrances for plastic material to the clearances between the rolls and the saddle plate, a seal at each end of said saddle plate to confine plastic material within the saddle plate clearances, a passageway through the housing and saddle plate for discharging milled plastic material, and means for rotating the rolls in counterdirections and towards the saddle plate and bite area.

11. Apparatus for continuous milling of plastic material comprising in combination, a pair of rotatable parallel smooth surfaced longitudinal cylinders separated from each other by a milling clearance to form a bite for milling the plastic, a housing enclosing and supporting said cylinders, said housing having a chamber open to the rolls and a smooth surfaced saddle plate partially encircling each of said cylinders including the said milling clearance bite, said saddle plate having a minimum total clearance from the cylinders not less than the bite clearance between the rolls and an increasing clearance in each direction away from said milling bite to form on each side thereof a convergent entrance leading toward said bite, a seal at each end of said saddle plate for confining plastic material within the convergent entrances and milling bite of the cylinders, a passageway through the saddle plate and housing for discharging milled plastic material confined by the saddle plate and its seals, and means for rotating the cylinders in counterdirections and towards the convergent entrances.

12. Apparatus for milling and conveying plastic material comprising in combination, a rotor having a smooth surface of revolution, a stationary surface at least partially encircling the rotor and eccentrically positioned with respect to the rotor to form therebetween a converging space decreasing to a plastic milling clearance extending longitudinally along and circumferentially around a portion of the rotor's periphery.

13. Apparatus for milling and extruding plastic material comprising in combination a rotor having a smooth surface of revolution, a stationary surface at least partially enclosing the rotor and having a smooth-surfaced longitudinal portion projecting towards the rotor and terminating at a plastic milling clearance distance from the rotor surface to form a convergent space between the rotor and the stationary surface, and a passageway through the stationary surface communicating with the convergent space for discharging plastic material.

HERBERT A. SWALLOW.

References Cited in the file of this patent

UNITED STATES PATENTS

| Number | Name | Date |
|---|---|---|
| 1,980,589 | Acree | Nov. 13, 1934 |
| 2,261,257 | Kiesskalt et al. | Nov. 4, 1941 |
| 2,264,237 | Brown | Nov. 25, 1941 |
| 2,319,040 | Conklin | May 11, 1943 |
| 2,434,707 | Marshall | Jan. 20, 1948 |
| 2,519,014 | Bankey | Aug. 15, 1950 |
| 2,519,834 | Hanson et al. | Aug. 22, 1950 |